United States Patent [19]

Sanders, Jr. et al.

[11] E Patent Number: Re. 33,092

[45] Reissued Date of Patent: Oct. 17, 1989

[54] HIGH STRENGTH WELDABLE ALUMINUM BASE ALLOY PRODUCT AND METHOD OF MAKING SAME

[75] Inventors: Robert E. Sanders, Jr.; Jocelyn I. Petit, both of New Kensington, Pa.

[73] Assignee: Aluminum Company of America, Pittsburgh, Pa.

[21] Appl. No.: 76,051

[22] Filed: Jun. 8, 1987

Related U.S. Patent Documents

Reissue of:

[64] Patent No.: 4,610,733
Issued: Sep. 9, 1986
Appl. No.: 683,021
Filed: Dec. 18, 1984

[51] Int. Cl.[4] ..... C22F 1/04

[52] U.S. Cl. ..... 148/12.7 A; 148/417; 148/418

[58] Field of Search ..... 148/11.5 A, 12.7 A, 148/417, 418, 439

[56] References Cited

U.S. PATENT DOCUMENTS 2,784,126 3/1957 Criner ..... 148/32.5
3,826,688 7/1974 Levy ..... 148/2

FOREIGN PATENT DOCUMENTS 1089454 11/1967 United Kingdom .

*Primary Examiner*—R. Dean
*Attorney, Agent, or Firm*—Andrew Alexander

[57] ABSTRACT

A weldable aluminum base alloy product is disclosed which is characterized by high strength, including high resistance to ballistic penetration and resistance to stress-corrosion cracking. The alloy consists essentially of from above 5 wt. % to 7 wt. % copper, 0 to 0.8 wt. % manganese, 0.1 wt. % titanium, 0 to 0.25 wt. % vanadium, 0 to 0.25 wt. % zirconium and 0.10 to 0.30 wt. % magnesium with the balance consisting essentially of aluminum. The alloy is cold worked a minimum amount equivalent to 6% stretching at room temperature after solution heat treatment and quenching, preferably by stretching. The alloy is then aged, after cold working, for at least 2 hours at a temperature of at least 121° C. (250° F.).

23 Claims, 2 Drawing Sheets

HIGH STRENGTH WELDABLE ALUMINUM BASE ALLOY PRODUCT AND METHOD OF MAKING SAME

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an aluminum base alloy product. More particularly, this invention relates to an aluminum base alloy product which is weldable and further characterized by high stress-corrosion cracking resistance and by high strength making the alloy suitable for ballistics armor, including armor-piercing and fragment ballistics protection.

2. Background of the Invention

Aluminum, when used as a combination structural and armor plate material for military vehicles, must be easily weldable and have high corrosion resistance, particularly stress-corrosion cracking (SCC) resistance. In addition, of course, as armor it must possess a high strength for ballistics protection both against fragments from exploding shells and armor-piercing projectiles. While the ballistics protection is related to the thickness of the armor, weight constraints dictate that higher strength thinner armor be used in preference to thicker products made from alloys with less strength. Furthermore, the alloy must be capable of being cast or welded into various shapes and sizes, particularly when used in space frame and open frame applications.

It is known that the addition of copper and magnesium to an aluminum base alloy will increase its strength. For example, British Patent No. 1,089,454 teaches the use of an aluminum base alloy containing 5 to 7% copper and 0.1 to 0.5% magnesium as well as an optional silver additive to obtain an alloy suitable for use in aero-engine components operating in elevated temperatures when the alloy is in the wrought or worked state and has been subsequently heat treated, quenched and then artificially aged for 5 to 36 hours between 170° and 250° C. Criner U.S. Pat. No. 2,784,126, assigned to the assignee of this invention, teaches a high strength aluminum base alloy suitable for use in internal combustion engines. This alloy contains 0.05 to 0.70% magnesium and 5 to 13% copper as well as manganese, vanadium and zirconium. In addition, an alloy registered with the Aluminum Association as 2001 for use as containers for bottled gas contains 5.2 to 6% copper, 0.2 to 0.45 magnesium and 0.15 to 0.50 manganese, plus impurities.

Levy U.S. Pat. No. 3,826,688 describes an Al—Cu—Mg alloy product having up to about 5% copper and up to about 2% magnesium to achieve a substantially single phase structure to improve the fracture toughness of the resulting alloy product after heating treatment, working and aging.

It is also known that cold work after solution heat treatment and quenching can increase the strength of Mg-free Al—Cu alloys, e.g., Aluminum Association alloy (AA)2219, and of Al—Cu—Mg alloys containing more than about 1.2% magnesium, e.g. AA2024. This effect is evident in naturally aged (T3) and artificially aged (T8) tempers. This effect of cold work after solution heat treatment on increasing strength, however, is minimal or nonexistent in Al—Cu—Mg alloys, e.g., AA2014 and AA2017, containing magnesium at 0.2 to 0.8% levels, but low copper levels, i.e., about 4.5%. Moreover, cold work before artificial aging decreases the strength of a Mg-free Al—Cu alloy containing small amounts of certain elements, such as Sn or Cd, e.g., AA2021.

However, while some of these combinations of copper and magnesium in an aluminum base alloy will contribute to increases in strength, it is also known that the presence of high amounts of both copper and magnesium, in combination, can render the alloy difficult to cast as well as interfering with its weldability.

Quite surprisingly, in view of the prior art metallurgical literature, it has now been discovered, however, that an aluminum base alloy product containing copper and small controlled amounts of magnesium and utilizing critical cold working and aging treatments may be produced having suitable stress-corrosion cracking resistance, high strength rendering it suitable for use as armor for ballistics protection, as well as acceptable weldability and castability.

SUMMARY OF THE INVENTION

It is, therefore, an object of this invention to produce an improved aluminum base alloy product characterized by good stress-corrosion cracking resistance, high strength, and acceptable weldability.

It is another object of this invention to produce an improved aluminum base alloy product characterized by good stress-corrosion cracking resistance, high strength and acceptable weldability from about 5 wt % to 7 wt. % copper and 0.1 to 0.30 wt. % magnesium.

It is yet another object of this invention to provide an improved aluminum base alloy product characterized by good stress-corrosion cracking resistance, high strength and acceptable weldability utilizing from above 5 wt % to 7 wt. % copper and 0.1 to 0.30 wt. % magnesium wherein the alloy is cold worked to achieve certain properties after solution heat treatment and quenching of the alloy.

It is a still further object of this invention to provide an improved aluminum base alloy product characterized by good stress-corrosion cracking resistance, high strength and acceptable weldability utilizing from above 5 wt. % to 7 wt. % copper and 0.1 to 0.30 wt. % magnesium wherein the alloy is cold worked to achieve certain properties after solution heat treatment and quenching of the alloy by cold working the aluminum to at least 6%.

It is another object of this invention to provide an improved aluminum base alloy product characterized by good stress-corrosion cracking resistance, high strength and acceptable weldability utilizing from above 5 wt. % to 7 wt. % copper and 0.1 to 0.30 wt. % magnesium wherein the alloy is cold worked to achieve certain properties after solution heat treatment and quenching of the alloy by stretching the aluminum at least 6%.

It is a further object of this invention to provide an improved aluminum base alloy product characterized by good stress-corrosion cracking resistance, high strength and acceptable weldability utilizing from above 5 wt. % to 7 wt. % copper and 0.1 to 0.30 wt. % magnesium wherein the alloy is cold worked to achieve certain properties after solution heat treatment and quenching of the alloy by stretching the aluminum at least 6% and then aging the alloy, after cold working, for a period of at least 2 hours at a temperature of at least 121° C. (250° F.).

These and other objects of the invention will be apparent from the drawings and following description.

In accordance with the invention, an aluminum base alloy product characterized by high strength, including high resistance to ballistic penetration, and stress-corrosion cracking, as well as good weldability, comprises an alloy consisting essentially of from above 5 wt. % to 7 wt. % copper, 0 to 0.8 wt. % manganese, 0.1 wt. % titanium, 0 to 0.25 wt. % vanadium, 0 to 0.25 wt. % zirconium and 0.10 to 0.30 wt. % magnesium which has been cold worked, after solution heat treatment and quenching, to at least 6% and then artifically aged for at least 2 hours at a temperature of at least 121° C. (250° F.).

DESCRIPTION OF A PREFERRED EMBODIMENT

The aluminum base alloy material of the invention is characterized by an acceptable weldability and castability with good stress-corrosion cracking resistance and sufficient strength to provide acceptable ballistics protection, including protection against fragment-producing projectiles and armor piercing projectiles. The resulting alloy product possesses sufficient strength and stress corrosion cracking resistance, as well as weldability, to find application in use both as ballistic armor as well as frame material for armored vehicles or space vehicles, or the like. The aluminum base alloy consists essentially of (in wt. %) from above 5 wt. % to 7.0 copper, 0 to 0.8 manganese, 0.10 to 0.30 magnesium, 0.1 titanium, 0 to 0.25 vanadium and 0 to 0.25 zirconium. The maximum iron content in the alloy is 0.5, preferably 0.3 or lower. The maximum silicon content is 0.5, preferably 0.2 or lower, and the maximum zinc content is 0.1. Preferably, the alloy contains not more than 0.20 magnesium, 0.1 to 0.15 vanadium, and 0.1 to 0.15 zirconium. Most preferably, the magnesium content is about 0.15.

In accordance with the invention, to develop the required properties, the aluminum base alloy just described must be cold worked to an equivalent, at room temperature, of at least 6% stretching and, preferably from 8 to 20%, after solution heat treatment and quenching of the alloy. Preferably, this cold working is carried out by stretching the alloy to at least 6% of its length and, preferably from 8 to 20%. The alloy product may also be cold rolled from 8 to 20% in lieu of stretching.

The use of the term "cold working" herein is intended to define any type of mechanical working, such as, for example, stretching or cold rolling, which is carried out at a temperature below about 50° C. (104° F.).

Figure 1:
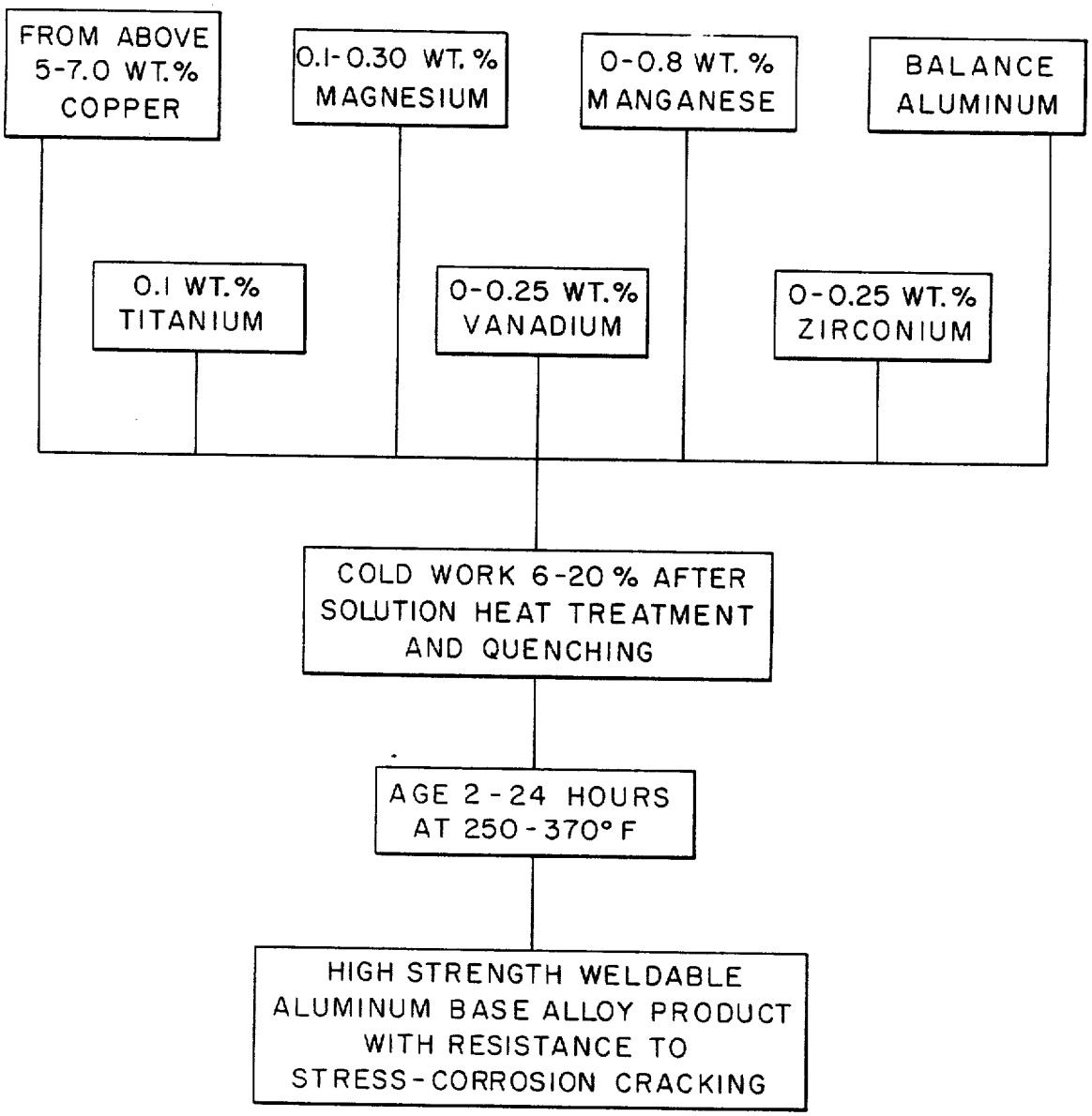
FIG. 1 is a flow sheet illustrating formation of the novel base aluminum alloy product of the invention.
Figure 2:
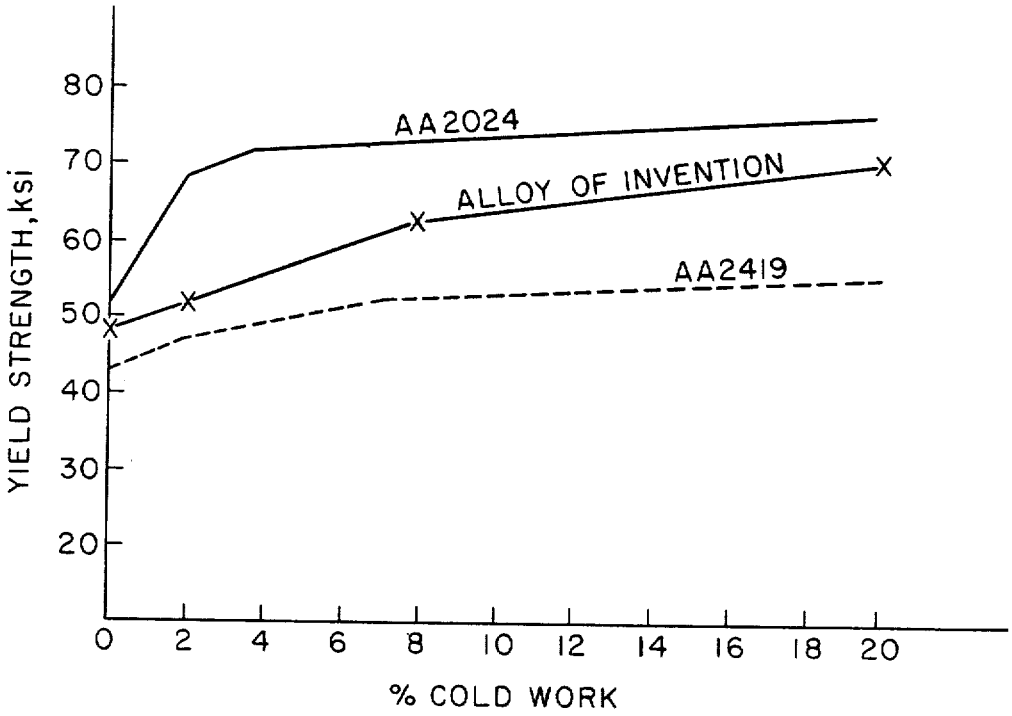
FIG. 2 is a graph comparing the yield strengths of the alloy product of the invention with prior art alloys plotted against percent cold working.

It is, of course, recognized that most aluminum alloy products may be stretched to some small degree, i.e., about 2% after quenching. However, this type of stretching is applied to redistribute residual stresses introduced by the quench rather than a specific cold working, as in the practice of this invention, to achieve certain desired properties. Furthermore, the resulting increase in strength produced in accordance with the invention by stretching or cold rolling beyond 2% is quite surprising since, as shown in FIG. 2, cold working beyond 2% only produces modest strength improvements in commercial Al—Cu—Mg alloys, such as AA2024 in artificially aged (T8X) tempers. FIG. 2 shows the yield strength attainable at various cold working percentages, respectively, for AA2024, an alloy which, although having high strength, cannot be welded; the alloy of the invention; and AA2419, which does not attain the high strength achievable in accordance with the invention.

In accordance with a further aspect of this invention, the cold worked alloy must be aged at a temperature of at least 121° to 188° C. (250° to 370° F.), preferably about 149° to 163° C. (300° to 325° F.), and, most preferably, from about 157° to 163° C. (315° to 325° F.), for at least 2 hours to about 24 hours, preferably about 16 hours, to achieve the desired strength and stress-corrosion cracking resistance properties. Since the aging times and temperatures are interrelated, longer aging times should be used at the lower aging temperatures and vice versa.

The following comparative examples will serve to further illustrate the novel and surprising characteristics which may be obtained in the practice of the invention as compared to characteristics or properties obtained using prior art alloys and prior art working and aging procedures.

EXAMPLE 1

Aluminum base alloy ingots, cast as 16 inch thick ingots, using the alloy of the invention and Aluminum Association (AA) alloy 2219, were preheated for 4 hours at 482° C. (900° F.), hot rolled at a starting temperature of 427° C. (800° F.) to a thickness of 1.5 inch, solution heat treated for 2 hours at 529° C. (985° F.), water quenched and then stretched 6 to 8% followed by aging for 20 hours at 163° C. (325° F.). The alloying materials in these alloys are listed in Table I.

TABLE I

| | Alloying Constituents and Impurities in Wt. % | | | | | | | | |
|---|---|---|---|---|---|---|---|---|---|
| Alloy | Cu | Mg* | Mn | Si* | Fe* | V | Zr | Ti* | Zn* |
| Invention | 5.0–7.0 | 0.10–0.30 | 0–0.8 | 0.2 | 0.3 | 0.1–0.15 | 0.1–0.15 | 0.1 | 0.1 |
| 2219 | 5.8–6.8 | 0.02 | 0.20–0.40 | 0.20 | 0.30 | 0.05–0.15 | — | 0.02–0.10 | 0.1 |
| 2419 | 5.8–6.8 | 0.02 | 0.20–0.40 | 0.15 | 0.18 | 0.05–0.15 | — | 0.02–0.10 | 0.1 |
| 7039 | 0.10 | 2.3–3.3 | 0.10–0.40 | 0.30 | 0.40 | — | — | 0.10 | 3.5–4.5 |

AA2219 alloy is known to provide good stress-corrosion cracking resistance and good weldability. Table II shows the yield strength (YS), tensile strength (TS), elongation and ballistics protection for samples made from alloy AA2219, the alloy of the invention using 0.16 wt. % magnesium and the alloy of the invention using 0.25 wt. % magnesium. The tabulated ballistics protection data for both 30 caliber armor piercing bullets (30 AP) and 20 mm fragment simulating projectiles (20 mm FSP) is on a merit rating compared to Aluminum Association alloy AA7039-T64, an alloy with known superior ballistics protection but having severe stress-corrosion cracking susceptibility. It will be noted, therefore, that the alloy of the invention provides comparable ballistics protection to alloy AA7039-T64 and superior ballistics protection and physical strength properties to AA alloy 2219.

TABLE II

| Alloy | YS | TS | Elong. | Ballistic Data* 30 AP | 20 mm FSP |
|---|---|---|---|---|---|
| AA2219 | 58.3 | 69.4 | 10.2% | .90 | .93 |
| Invention (0.16 wt. % Mg) | 66.2 | 71.4 | 10.7% | 1.01 | 1.01 |
| Invention (0.25 wt. % Mg) | 68.5 | 73.1 | 10.5% | 1.01 | 1.07 |

*weight merit rating compared to alloy 7039-T64 ballistic armor plate (1.0 = equivalence to 7039)

EXAMPLE 2

To further illustrate the properties of the invention, 0.64 inch thick samples of Aluminum Association (AA) alloy 2419 and the alloy of the invention were formed similarly to the samples of Example 1. After quenching, the samples were, respectively, subjected to four levels of cold working by stretching (at 2% or 8%) or cold rolling (at 20%); and samples subjected to each of these cold working points were aged for various times and temperatures to illustrate the synergistic effect between alloy composition, cold working and aging. All entries listed in Table III represent yield strength in ksi.

Table III shows that with no cold working or aging, the alloy composition of the invention shows a yield strength advantage of 11 ksi over AA2419. However, for both alloys, the strengths are unacceptably low. When samples of both alloys are aged for 16 hours at 163° C. (325° F.), but with no cold working, the strength differences for the two alloys are only 5.1 ksi for a yield strength of 43.1 ksi for AA2419 and 48.2 ksi for the alloy of the invention. When the two alloys are both cold worked at 20% but with no aging, the differential is even less, at 2.6 ksi. However, when the alloys are both cold worked and aged in accordance with the practice of the invention, the result is a 9.7 ksi advantage at 8% cold working for the alloy of the invention and 14.8 ksi advantage at 20% cold working.

Furthermore, it will be noted that the combination of aging and cold working provides a synergistic effect in combination with the alloy composition of the invention which is not noted for AA2419. Thus, the addition of 20% cold working over 0% for AA2419 aged for 16 hours at 163° C. (325° F.) only increases the strength from 43.1 ksi to 55.2 ksi (a 28% increase) while the corresponding differences for the alloy product of the invention are 48.2 ksi and 70.0 ksi (for a 45% increase).

TABLE III

| Aging Hr./Temp. (°F.) | Alloy 2419 % Cold Work 0 | 2 | 8 | 20 | Alloy of invention 0 | 2 | 8 | 20 |
|---|---|---|---|---|---|---|---|---|
| 0 | 23.2 | 27.1 | 35.0 | 45.5 | 34.4 | 38.2 | 39.4 | 48.1 |
| 8/300 | 34.2 | 37.0 | 45.4 | 53.9 | 38.2 | 38.2 | 49.4 | 57.6 |
| 24/300 | 39.0 | 42.7 | 51.0 | 57.1 | 42.8 | 49.9 | 58.2 | 65.9 |
| 48/300 | 43.2 | 47.4 | 53.8 | 56.3 | 48.3 | 52.6 | 62.6 | 70.6 |
| 8/325 | 39.7 | 43.9 | 50.6 | 56.0 | 44.9 | 47.6 | 59.7 | 68.7 |
| 16/325 | 73.1 | 47.6 | 52.7 | 55.2 | 48.2 | 51.7 | 62.4 | 70.0 |

TABLE III-continued

| Aging Hr./Temp. (°F.) | Alloy 2419 % Cold Work 0 | 2 | 8 | 20 | Alloy of invention 0 | 2 | 8 | 20 |
|---|---|---|---|---|---|---|---|---|
| 24/325 | 43.4 | 48.8 | 52.4 | 54.0 | 50.8 | 53.6 | 62.9 | 69.2 |

EXAMPLE 3

Plates made in accordance with the invention were tested for weldability and resistance to stress-corrosion cracking (SCC). The alloy product was easily welded using the gas metal arc process with standard AA2319 filler wire using the same procedures conventionally used for welding AA2219 alloy. Properties of the weldments were obtained and compared to alloys AA2219 and AA7039, as listed below in Table IV.

TABLE IV

| | Properties of Weldments Yield Strength | Tensile Strength | Elongation |
|---|---|---|---|
| Invention | 34.7 | 36.7 | 5.5 |
| AA2219-T87* | 26 | 35 | 3 |
| AA7039-T61* | 31 | 45 | 11 |

*Typical Values

EXAMPLE 4

Plates made in accordance with the invention were subjected to short-traverse SCC tests using 0.125 inch diameter tensile bars in accordance with ASTM procedure G44-75. For specimens stressed at 40 ksi and 35 ksi, no failures were observed prior to 35 days of exposure to alternate immersion testing. (This compares very favorably with tests for 7039-T6X armor plate, where failures [at 35 ksi] in less than 4 days are common.) As shown in Table V, five specimens were tested in each sample group, and the numbers in the Days Column indicate respectively whether each specimen passed the 84 days without failure or the day on which failure occurred.

TABLE V

| Sample Group | Gauge, Inches | Results of Stress-Corrosion Tests Applied Stress, ksi | F/N* | Days |
|---|---|---|---|---|
| 1 | 1.0 | 40 | 0/5 | OK-84 |
| | | 35 | 0/5 | OK-84 |
| 2 | 1.5 | 40 | 4/5 | 37;84;84;84(1-OK-84) |
| | | 35 | 2/5 | 43;57(3-OK-84) |
| 3 | 1.5 | 40 | 0/5 | OK-84 |
| | | 35 | 0/5 | OK-84 |
| 4 | 1.5 | 40 | 0/5 | OK-84 |
| | | 35 | 0/5 | OK-84 |
| 5 | 2.0 | 40 | 0/5 | OK-84 |
| | 35 | 0/5 | OK-84 | |
| 6 | 3.25 | 40 | 0/5 | OK-84 |
| | | 35 | 0/5 | OK-84 |

*F/N denotes number of specimens failed over number exposed

Thus, the invention provides a novel high strength aluminum base alloy product wherein the alloy content, cold working and aging characteristics synergistically provide a material having the surprising combination of acceptable weldability, good stress-corrosion cracking resistance and high strength suitable for use as ballistics protection armor for armor-piercing projectiles and fragments from exploding shells.

Having thus described the invention, what is claimed is:

1. An aluminum base alloy product characterized by high strength, including high resistance to ballistic penetration, resistance to stress-corrosion cracking, and acceptable weldability comprising: an alloy consisting essentially of from above 5 wt. % to 7.0 wt. % copper, 0 to 0.8 wt. % manganese, 0.1 wt. % titanium *max.*, 0 to 0.25 wt. % vanadium, 0 to 0.25 wt. % zirconium and 0.10 to 0.30 wt. % magnesium with the balance consisting essentially of aluminum, said alloy being cold worked an amount equivalent to a minimum of 6% stretching at room temperature after solution heat treatment and quenching, said alloy being aged after said cold working for at least 2 hours at a temperature of at least 121° C. (250° F.).

2. The alloy product of claim 1 wherein said cold working is equivalent to room temperature stretching of from 6 to 20%.

3. The alloy product of claim 1 wherein said cold working comprises stretching.

4. The alloy product of claim 3 wherein after stretching, said alloy is aged at a temperature of from 149° 163° C. (300° to 325° F.).

5. The alloy product of claim 4 wherein said alloy is aged for from 8 to 24 hours.

6. The alloy product of claim 5 wherein said alloy is aged at a temperature of from 157° to 163° C. (315° to 325° F.).

7. The alloy of claim 1 wherein the magnesium content is about 0.15 wt. %.

8. The alloy of claim 1 wherein the maximum silicon impurity is 0.2 wt. %.

9. An aluminum armor plate alloy product characterized by high strength including high resistance to ballistic penetration, resistance to stress-corrosion cracking, and acceptable weldability comprising an alloy consisting essentially of from above 5 wt. % to 7 wt. % copper, 0 to 0.8 wt. % manganese, 0.1 wt. % titanium *max.*, 0 to 0.25 wt. % vanadium, 0 to 0.25 wt. % zirconium and 0.10 to 0.30 wt. % magnesium with the balance consisting essentially of aluminum, which has been cold worked an amount equivalent to at least 6% stretching at room temperature and then artificially aged for at least 8 hours at a temperature of from 149° to 163° C. (300° to 325° F.).

10. The alloy of claim 9 wherein said cold working is equivalent to room temperature stretching of from 6 to 20%.

11. The alloy of claim 10 wherein said cold working comprises stretching.

12. A high strength, stress corrosion resistant and weldable aluminum alloy product suitable for use as a vehicle frame for a space vehicle comprising an alloy consisting essentially of from above 5 wt. % to 7 wt. % copper, 0 to 0.8 wt. % manganese, 0.1 wt. % titanium *max.*, 0 to 0.25 wt. % vanadium, 0 to 0.25 wt. % zirconium and 0.10 to 0.30 wt. % magnesium with the balance consisting essentially of aluminum, which has been cold worked an amount equivalent to at least 6% stretching at room temperature and then artificially aged for at least 8 hours at a temperature of from 149° to 163° C. (300° to 325° F.).

13. The alloy of claim 12 wherein said cold working is equivalent to room temperature stretching of from 6 to 20%.

14. The alloy of claim 13 wherein said cold working comprises stretching.

15. A method of making an aluminum base alloy product characterized by high strength including high resistance to ballistic penetration, resistance to stress-corrosion cracking, and weldability, comprising the steps of:

(a) forming an alloy consisting essentially of from above 5 wt. % to 7 wt. % copper, 0 to 0.8 wt. % manganese, 0.1 wt. % titanium *max.*, 0 to 0.25 wt. % vanadium, 0 to 0.25 wt. % zirconium and 0.1 to 0.3 wt. % magnesium with the balance consisting essentially of aluminum;

(b) cold working the alloy an amount equal to at least 6% stretching at room temperature after solution heat treatment and quenching: and (c) aging the cold worked alloy for at least 2 hours at a temperature of at least 121° C. (250° F.).

16. The process of claim 15 wherein said step of cold working comprises stretching the alloy an amount equivalent to at least 6% at room temperature.

17. The process of claim 16 wherein said alloy is stretched an amount equivalent to from 6 to 20% at room temperature.

18. The process of claim 17 wherein said aging step is carried out for 8 to 24 hours at a temperature of from 149° to 163° C. (300° to 325° F.).

19. The process of claim 18 wherein said aging step is carried out at a temperature of from 157° to 163° C. (315° to 325° F.).

20. The process of claim 19 wherein said aging step is carried out for at least 16 hours.

21. The process of claim 20 wherein said magnesium content is approximately 0.15 wt. %.

22. The alloy product of claim 1 wherein after cold working, said alloy is aged at a temperature of 121° to 163° C. (250° to 325° F.).

23. The method of claim 15 wherein the step of aging comprises aging the cold worked alloy at a temperature of from 121° to 163° C. (250° to 325° F.).

* * * * *

UNITED STATES PATENT AND TRADEMARK OFFICE

CERTIFICATE OF CORRECTION

PATENT NO. : Re. 33,092

DATED : October 17, 1989

INVENTOR(S) : Robert E. Sanders, Jr. and Jocelyn I. Petit

It is certified that error appears in the above-identified patent and that said Letters Patent is hereby corrected as shown below:

| | |
|---|---|
| Col. 4, line 58 | As a footnote to Table I, add --*Maximum values unless specified as a range--. |
| Claim 4<br>Col. 7, line 23 | After "149" insert --to--. |

Signed and Sealed this

Twenty-sixth Day of November, 1991

*Attest:*

HARRY F. MANBECK, JR.

*Attesting Officer*

*Commissioner of Patents and Trademarks*